United States Patent [19]

Harney

[11] Patent Number: 5,770,329
[45] Date of Patent: Jun. 23, 1998

[54] THERMAL BATTERY AND IMPROVED CELL THEREFOR

[75] Inventor: David Ellison Harney, Twinsburg, Ohio

[73] Assignee: Northrop Grumman Corporation, Los Angeles, Calif.

[21] Appl. No.: 786,580

[22] Filed: Jan. 21, 1997

[51] Int. Cl.⁶ .................................................. H01M 10/39
[52] U.S. Cl. ......................................... 429/112; 429/120
[58] Field of Search ................................... 429/112, 120, 429/218, 223, 220

[56] References Cited

U.S. PATENT DOCUMENTS 4,044,192  8/1977  Bowser, Jr. et al. .................... 439/112
5,382,479  1/1995  Schuster ................................... 429/112
5,437,940  8/1995  Hilston et al. ........................... 429/103

Primary Examiner—M. Nuzzolillo
Attorney, Agent, or Firm—Walter G. Sutcliff

[57] ABSTRACT

A thermal battery which includes a plurality of stacked battery cells within a thermally insulated case. Each battery cell includes an anode wafer, a cathode precursor wafer and an electrolyte wafer disposed between them. The electrolyte wafer is solid at room temperature and will become molten at a predetermined temperature. The cathode precursor wafer is of a formulation which is ignitable to supply the necessary heat to cause the electrolyte to become molten. After generation of the heat, the cathode precursor wafer becomes the cathode for the battery cell, thus eliminating the requirement to provide a separate heat wafer for each cell of the battery.

10 Claims, 4 Drawing Sheets

THERMAL BATTERY AND IMPROVED CELL THEREFOR

BACKGROUND OF THE INVENTION

1. Field of the Invention

The invention in general relates to high temperature primary batteries and more particularly to a thermal battery of the type which utilizes a molten salt as the electrolyte.

2. Description of Related Art

Thermal batteries are batteries which have an exceptionally long shelf life and when activated for use, provide a high energy output for a relatively short period of time. Such batteries find use in sonobuoys and guided ordnance systems, by way of example, as well as in systems or devices which require a one time only high energy power source.

A typical thermal battery has a plurality of cells each of which includes an anode wafer and a cathode wafer, with the anode and cathode being disposed on either side of an electrolyte wafer. The electrolyte is in solid form for long shelf life prior to use and is heated to a molten condition when battery activation is desired. In order to change the state of the electrolyte from a solid to a molten condition each cell has associated therewith an individual pyrotechnic heat source. That is, if a battery has, for example, 50 to 60 cells then 50 to 60 separate pyrotechnic heat sources are required.

In many operational situations requiring the use of thermal batteries it is often desirable to reduce the volume and weight of the overall payload. The present invention provides for a thermal battery which is of significantly lower weight and smaller volume compared to typical prior art thermal batteries.

SUMMARY OF THE INVENTION

A thermal battery in accordance with the present invention includes a plurality of stacked cells contained in a thermally insulated container. Each cell includes an anode wafer, a cathode precursor wafer and an electrolyte wafer disposed between them and being of the type which is solid at room temperature and which when heated to a predetermined temperature becomes molten to activate the battery.

The cathode precursor wafer is of a chemical composition which is ignitable and when ignited will generate sufficient heat to cause said electrolyte wafer to become molten and after said generation of said heat, will functionally operate as a cathode of said cell.

DESCRIPTION OF THE PREFERRED EMBODIMENTS

Figure 1:
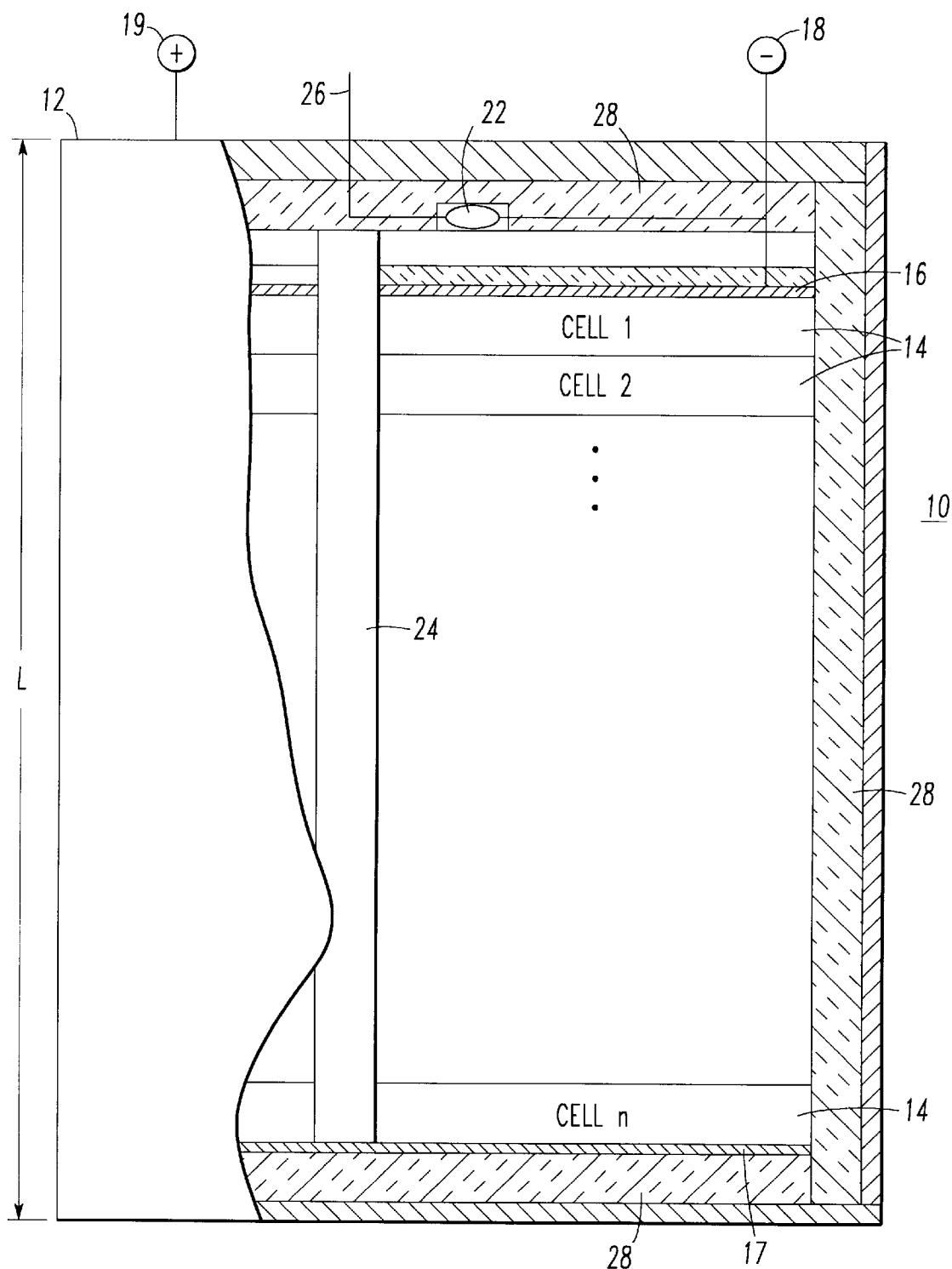
FIG. 1 is a schematic representation, partially in section, of a thermal battery of the prior art.

In the drawings, which are not necessarily to scale, like or corresponding parts are denoted by like or corresponding reference numerals.

The thermal battery 10 illustrated in FIG. 1 includes an outer metal container 12 of length L, having contained therein a plurality of individual stacked battery cells 14. A plurality of current collectors is provided, with the current collectors being connected to selected ones of the cells 14. By way of one example, electrically connected to each end of the stack of cells 14 are respective current collector plates 16 and 17 connected to respective external electrical terminals 18 and 19.

As will be described, battery activation is commenced by the application of heat which is supplied by means of a pyrotechnic heat source 22 in conjunction with a heat strip 24 which extends down the length of the battery 10 and engages each cell 14. The pyrotechnic heat source 22 may be electrically activated by means of a signal applied to electrical terminals 18 and 26.

In order to maintain as much of the generated heat as practical within the container 12, the interior of the container 12 is lined with thermal insulating material 28.

Figure 2:
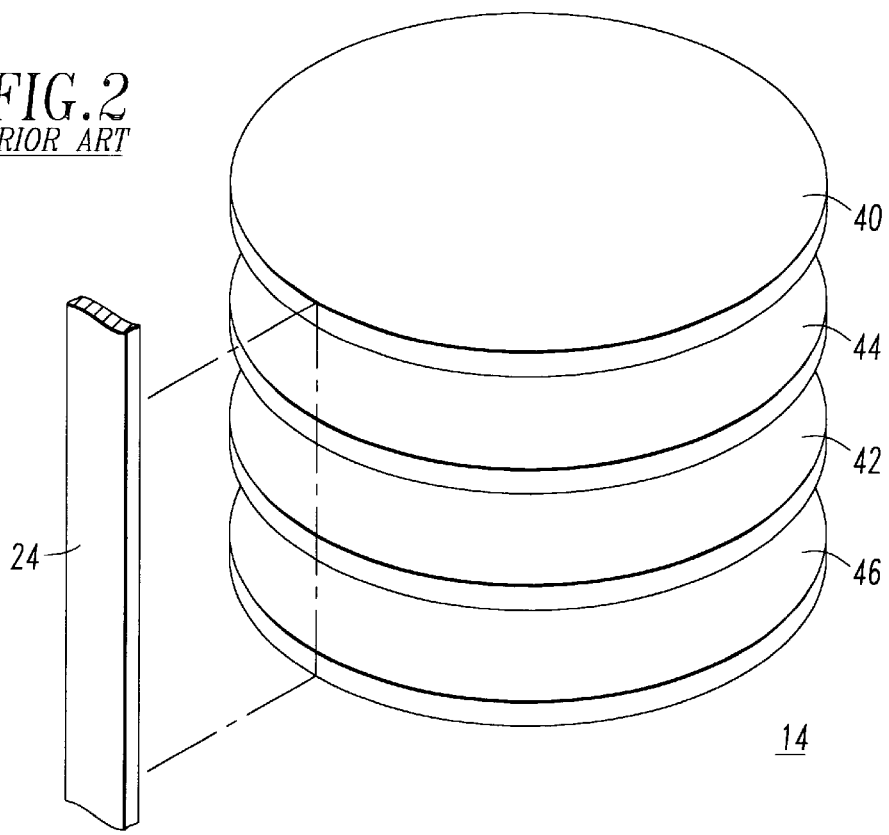
FIG. 2 is an exploded view of a single cell of the battery of FIG. 1.

As seen in the exploded view of FIG. 2, each cell 14 includes an anode 40, a cathode 42 and an electrolyte 44, each being in the form of a wafer, also known as a "pellet" to those skilled in the art. The electrolyte wafer 44 is sandwiched between the anode and cathode wafers 40 and 42 and is of the type which is solid at room temperature and which will become molten when heated.

In order to supply the necessary heat to transform the electrolyte into molten form, there is provided a heat wafer 46 which contacts the cathode wafer 42 and is ignited by means of the heat strip 24 which acts as a fuse after itself being ignited by the pyrotechnic heat source 22 (FIG. 1) at the top of the stack of cells 14.

By way of example, a commonly used thermal battery is of the lithium or lithium alloy/metal sulfide type. All of the wafers are initially in the form of a powdered mixture and are compacted by sufficient pressure, prior to battery assembly, into respective solid wafer structures.

In the lithium alloy/metal sulfide battery, the anode wafer 40 may be composed of a lithium-silicon alloy material, the cathode wafer 42 may be constituted by a cobalt disulfide, and the electrolyte wafer 44 may be a mixture of various metal salts such as lithium chloride and potassium chloride mixed with a binder of magnesium oxide. Often, to promote ionic conductivity, a small amount of electrolyte powder is added to the cathode material, and may be added to the anode material as well.

The heat wafer 46 is commonly formulated by a mixture of elemental iron and potassium perchlorate and the heat strip 24 is of a zirconium-barium chromate formulation.

When the heat wafer 46 is ignited the reaction is as follows:

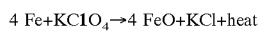

$$4\ Fe + KClO_4 \rightarrow 4\ FeO + KCl + heat$$

The amount of heat generated is varied by controlling the ratio of iron to potassium perchlorate. The mixture is always made iron rich which leaves the burned heat wafer 46 conductive to serve, after ignition, as an inactive intercell connector.

Figure 3:
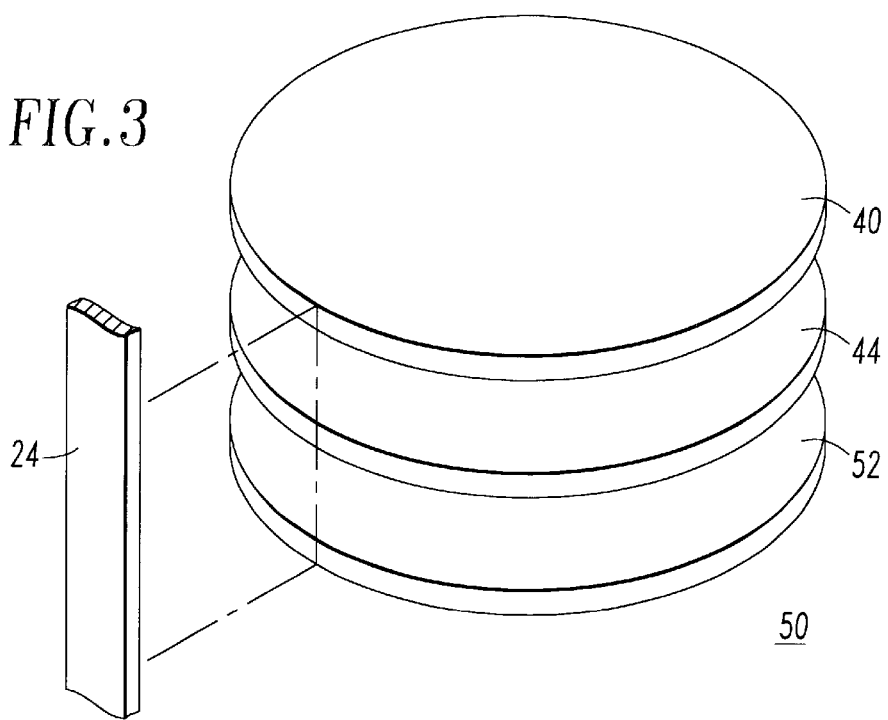
FIG. 3 is an exploded view of a single cell in accordance with one aspect of the present invention.

A cell arrangement in accordance with one embodiment of the present invention is illustrated in FIG. 3. The improved cell 50 includes an anode wafer 40 and electrolyte wafer 44, as before, however the heat wafer 46 has been eliminated. In the cell 50, the heat necessary to melt the electrolyte is provided by a cathode precursor wafer 52 of a chemical composition which, when ignited, will provide the required heat and will thereafter functionally operate as the cathode of the cell 50.

By way of example, wafer 52 utilizes a metal such as nickel, cobalt or copper or a combination thereof, the oxides of which exhibit good electrochemical properties, such as high half cell potential, high volumetric energy density, fast reaction rate and high density, to make suitable cathodes for cell operation. In addition, by substituting lithium perchlorate and/or lithium chloride for part of the potassium perchlorate, a LiCl—KCl electrolyte would be formed in-situ, imparting the necessary ionic conductivity to the resulting cathode. Using cobalt as a preferred metal, the reaction is as follows:

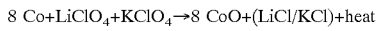

Thermodynamic calculations to compare calorific output of the candidate metals mentioned, reveals that cobalt and nickel have heat outputs similar to iron, followed by copper which is somewhat lower. Oxides of all of the candidate metals in a lithium alloy/metal oxide cell results in a cell having a theoretical voltage which even exceeds that of the typical lithium/cobalt disulfide cell in current use. Moreover, useful oxides of the candidate metals have melting points greater than the temperature generated by the pyrotechnic reaction involved, and will not become fluid upon activation.

Figure 4:
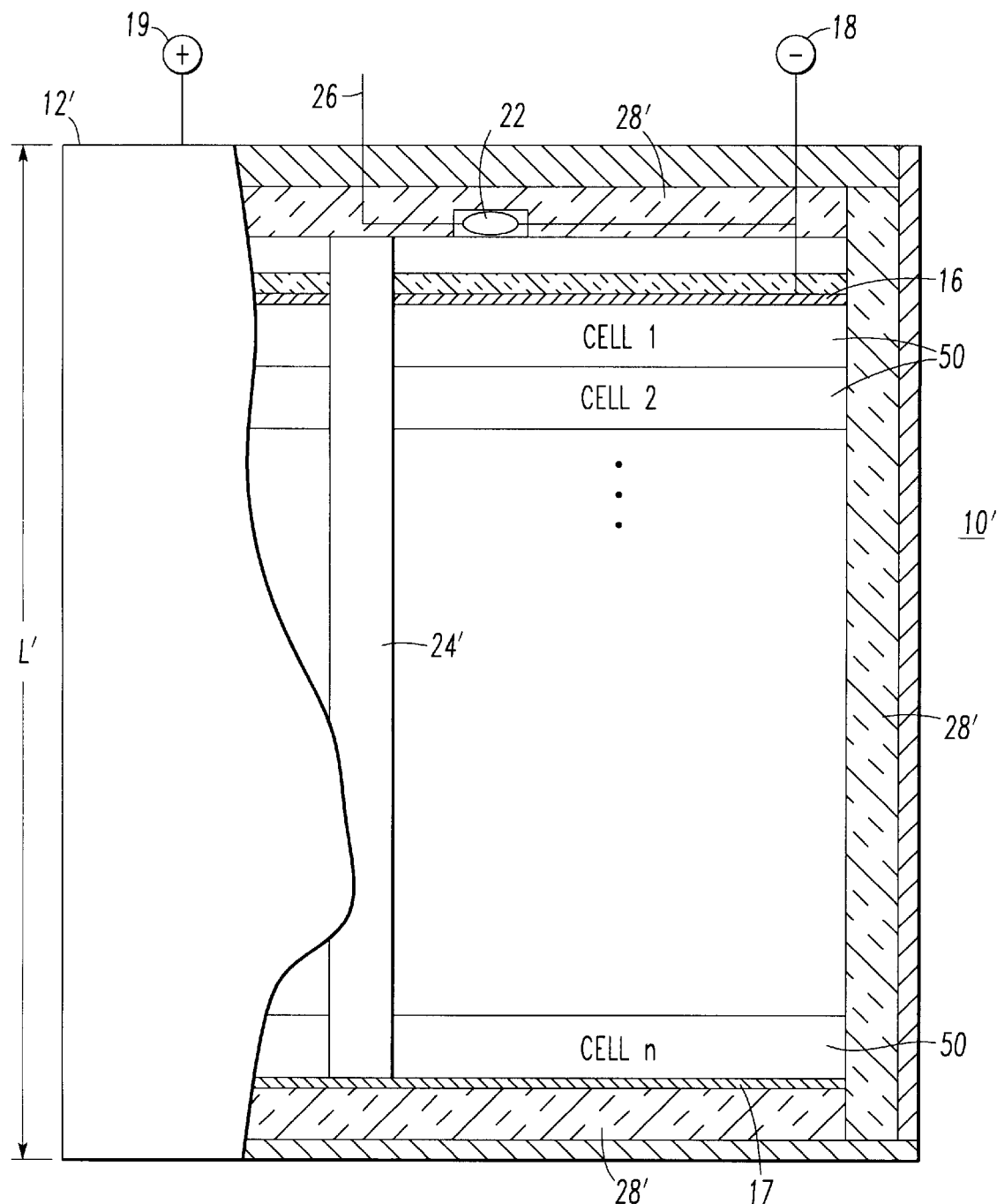
FIG. 4 is a schematic representation, partially in section, of an improved thermal battery in accordance with one embodiment of the present invention.

Accordingly, and as illustrated in FIG. 4, a fully operational thermal battery 10' may be fabricated with cells 50, and in view of the elimination of all of the separate heat wafers 46 (FIG. 2), the volume and weight of the thermal battery may be reduced. With the same diameter case and the same number of cells, the case 12' of FIG. 4 has an overall length of L', significantly reduced from that of FIG. 1, thus eliminating the weight of a portion of the metal case as well. Assuming a similar capacity and lifetime for both the batteries of FIGS. 1 and 4, calculations show a potential overall weight and volume savings of 30% with the improved arrangement described herein.

The ignition of the cathode precursor wafer 52 of FIG. 3 is accomplished by the provision of a heat strip 24. This heat strip may be eliminated by the direct activation of all of the cathode precursor wafers by the pyrotechnic heat source 22. In such case, a cell as illustrated in FIG. 5 may be used.

Figure 5:
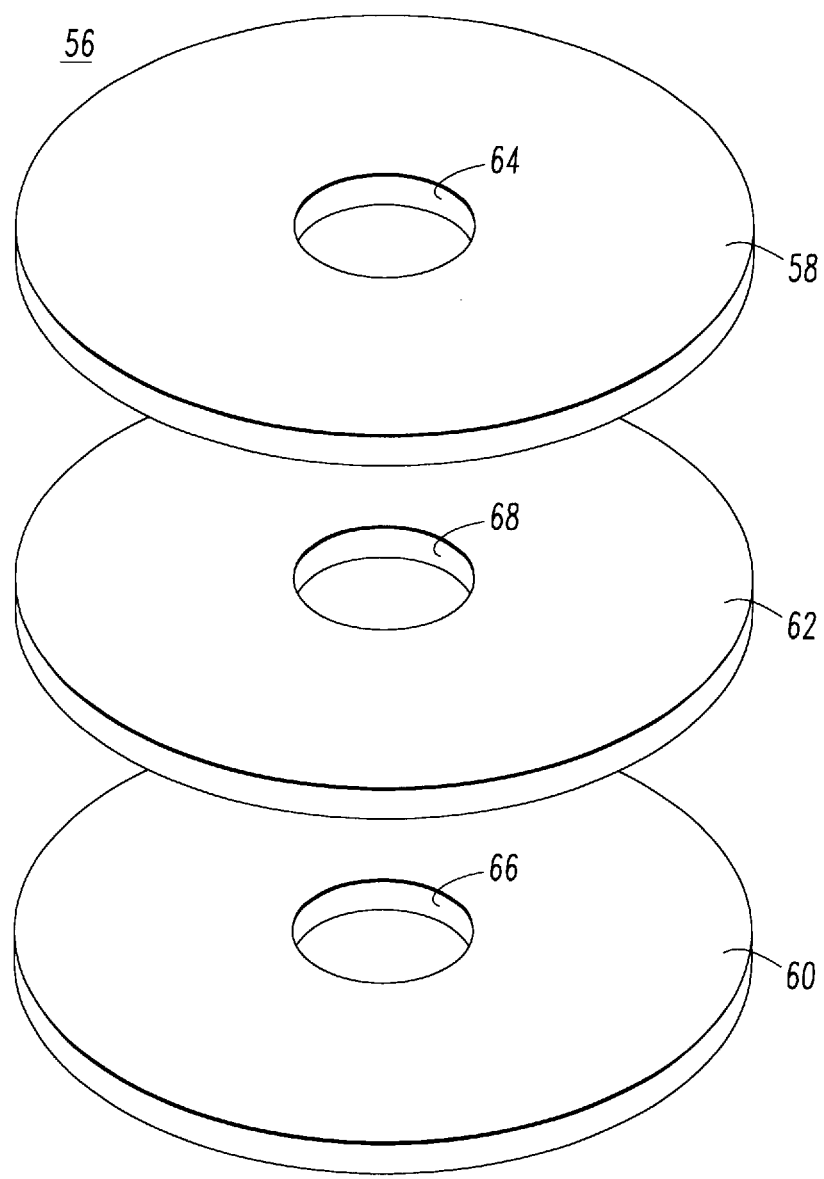
FIG. 5 is an exploded view of a single cell in accordance with another embodiment of the present invention.

The cell 56 of FIG. 5 includes an anode wafer 58, a cathode precursor wafer 60 and an electrolyte wafer 62, all having respective compositions previously described with regard to the wafers of FIG. 3. Each of the wafers illustrated in FIG. 5 includes a respective central aperture 64, 66 and 68, whereby the flame from a centrally disposed pyrotechnic heat source 22 may be directed downwardly through all of the central apertures of all of the cells 56 to cause ignition of the wafers 60.

Although the present invention has been described with a certain degree of particularity, it is to be understood that various substitutions and modifications may be made without departing from the spirit and scope of the invention as defined in the appended claims.

What is claimed is:

1. A thermal battery comprising:
   (A) a thermally insulated battery case;
   (B) a stack of similar battery cells contained within said case;
   (C) a plurality of current collectors positioned within said case and contacting selected ones of said battery cells;
   (D) a plurality of electric terminals respectively connected to said current collectors;
   (E) each said battery cell including
      (i) an anode wafer,
      (ii) a cathode precursor wafer, and
      (iii) an electrolyte wafer disposed between said wafers and being of the type which is solid at room temperature and which when heated to a predetermined temperature will become molten to activate the battery,
      (iv) said cathode precursor being of a chemical formulation which is ignitable and when ignited, will generate sufficient heat to cause said electrolyte wafer to become molten, and after generation of said heat, to functionally operate as a cathode of said battery cell; and
   (F) means for igniting said cathode precursor wafer.

2. A battery in accordance with claim 1 wherein:
   (A) said anode wafer includes lithium or an alloy of lithium;
   (B) said electrolyte is a salt compound; and
   (C) said cathode precursor includes an ignitable compound and an elemental metal selected from the group consisting of cobalt, nickel and copper, and combinations thereof.

3. A battery in accordance with claim 2 wherein:
   (A) said ignitable compound includes an additional compound whereby after said generation of said heat, said cathode will include a small portion of said electrolyte for imparting ionic conductivity.

4. A battery in accordance with claim 3 wherein:
   (A) said electrolyte is a combination including lithium chloride and potassium chloride; and
   (B) said ignitable compound is potassium perchlorate; and
   (C) said additional compound is selected from the group consisting of lithium perchlorate, lithium chloride and combinations thereof.

5. A battery in accordance with claim 1 wherein:
   (A) said means for igniting said cathode precursor wafer includes an electrically ignitable pyrotechnic heat source, and which includes
   (B) a heat strip in thermal contact with said electrically ignitable pyrotechnic heat source and extending the length of said stack and being in thermal contact with all of said cathode precursor wafers of said battery cells.

6. A cell for a thermal battery, comprising:
   (A) an anode wafer;
   (B) a cathode precursor wafer;
   (C) an electrolyte wafer disposed between said wafers and being of the type which is solid at room temperature and which when heated to a predetermined temperature will become molten to activate the battery;
   (D) said cathode precursor being of a chemical formulation which is ignitable and when ignited, will generate sufficient heat to cause said electrolyte wafer to become molten, and after generation of said heat, to functionally operate as a cathode of said battery cell.

7. A battery cell in accordance with claim 6 wherein:
   (A) said anode wafer includes lithium or an alloy of lithium;
   (B) said electrolyte is a salt compound; and
   (C) said cathode precursor includes an ignitable compound and an elemental metal selected from the group consisting of cobalt, nickel and copper, and combinations thereof.

8. A battery cell in accordance with claim 7 wherein:
(A) said ignitable compound includes an additional compound whereby after said generation of said heat, said cathode will include a small portion of said electrolyte for imparting ionic conductivity.

9. A battery cell in accordance with claim 8 wherein:
(A) said electrolyte is a combination including lithium chloride and potassium chloride; and
(B) said ignitable compound is potassium perchlorate; and
(C) said additional compound is selected from the group consisting of lithium perchlorate, lithium chloride and combinations thereof.

10. A battery cell in accordance with claim 6 wherein:
(A) each of said wafers includes a central aperture.

\* \* \* \* \*